UNITED STATES PATENT OFFICE.

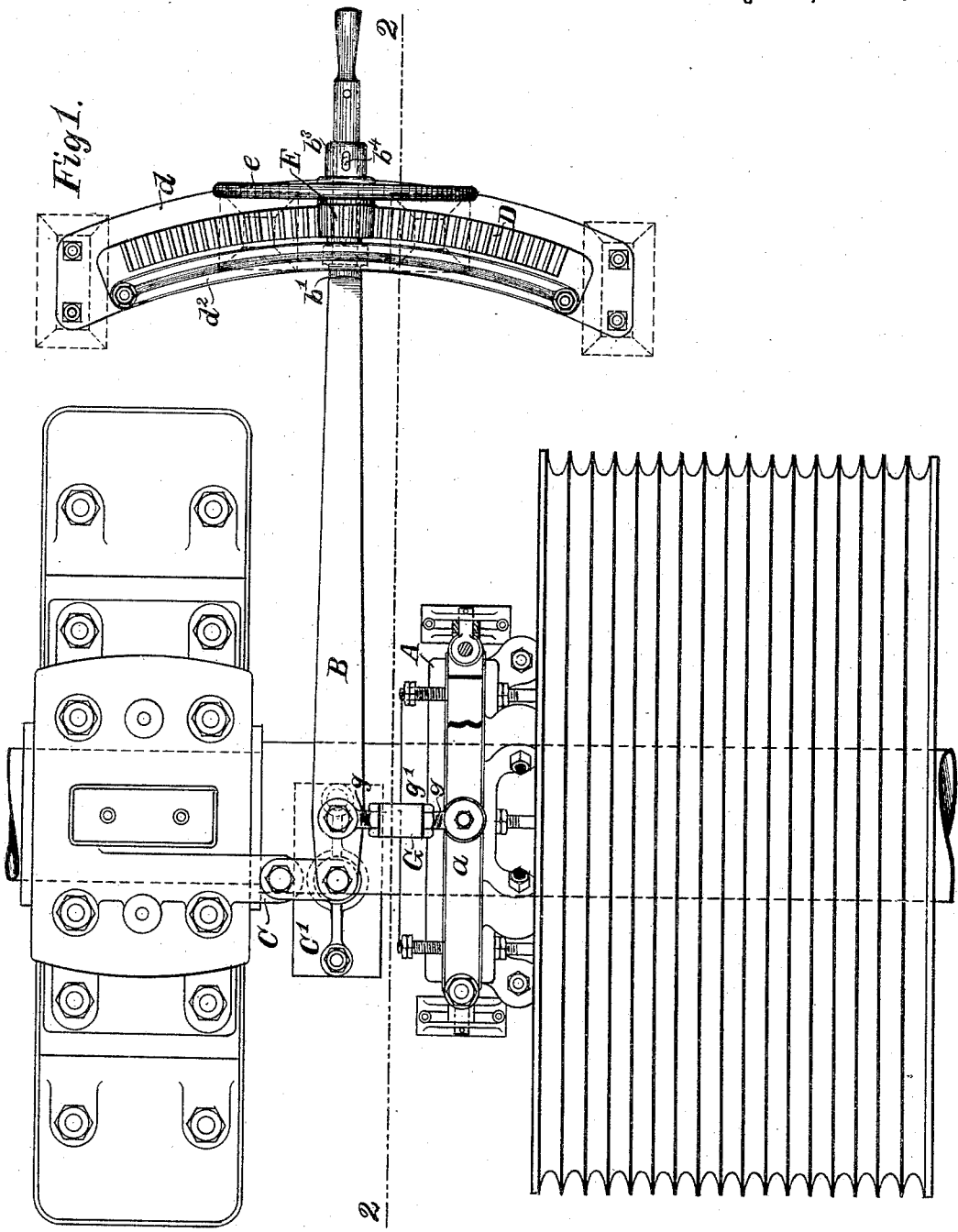

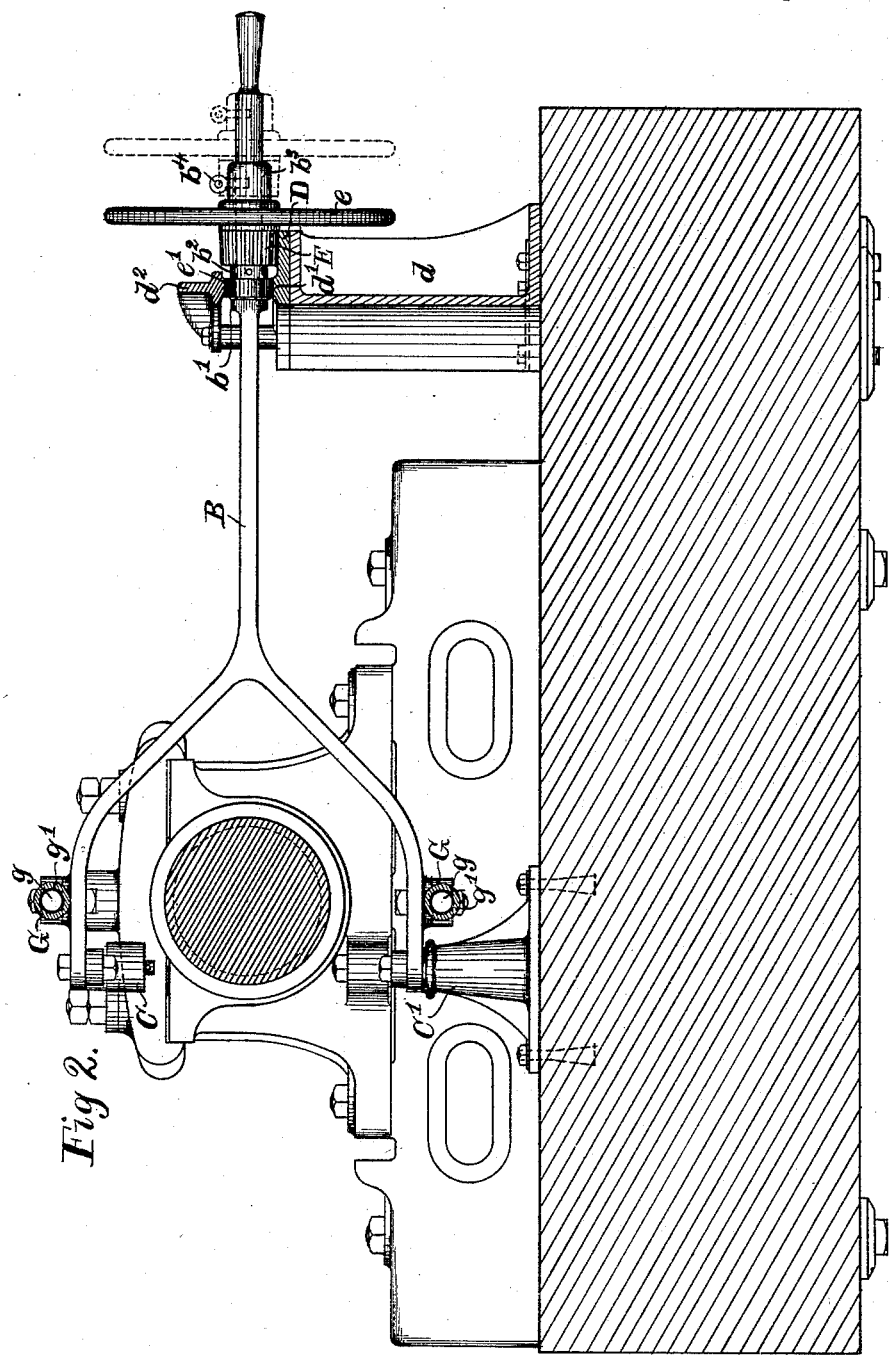

JOHN WALKER, OF CLEVELAND, OHIO.

DEVICE FOR OPERATING SLIDING SLEEVES.

SPECIFICATION forming part of Letters Patent No. 474,428, dated May 10, 1892.

Application filed February 4, 1892. Serial No. 420,337. (No model.)

*To all whom it may concern:*

Be it known that I, JOHN WALKER, a citizen of the United States, residing at Cleveland, in the county of Cuyahoga and State of Ohio, have invented certain new and useful Improvements in Devices for Operating Sliding Sleeves, of which the following is a specification.

My invention relates to mechanism for shifting the position of a sleeve slidable on a revolving shaft—as, for example, the sliding sleeve of a friction-clutch—and it is especially adapted to use in connection with heavy clutches, where a very considerable force is necessary to move said sleeve.

In the drawings my invention is shown in connection with a sliding sleeve of a multiple disk-clutch, substantially like the clutch shown in my application, Serial No. 420,338, filed February 4, 1892. As clutches of this character are often built nowadays the sliding sleeve and the parts which it moves weigh several tons, wherefore it is either necessary to provide a very long lever (for which there is generally no room) or some device whereby said sleeve may be moved by one man.

My invention has to do particularly with the means for supporting the sleeve-operating lever, the means for operating said lever, and the means for connecting the lever and sliding sleeve, all of which is hereinafter explained, and pointed out definitely in the claims.

In the drawings, Figure 1 is a plan view of a friction-clutch provided with my invention as the means for operating its sliding sleeve. Fig. 2 is a sectional view on line 2 2.

The sliding sleeve A is mounted upon the shaft in the usual manner—that is to say, it revolves with the shaft, but is adapted to slide longitudinally upon it. A collar $a$ surrounds the sleeve and lies in an annular groove therein, whereby the collar and sleeve move together in the latter's sliding movement, but do not revolve together.

B represents a forked lever, the forks of which are supported by and fulcrumed to a fixed standard $C'$ and an arm $C$, suitably supported in a plane above the shaft. In the embodiment of the invention shown the arm $C$ is connected to and extends from the standard in which one end of the shaft is journaled.

A segmental rack D, curved in the arc of a circle, of which the fulcrum of the lever B is the center, is suitably supported by standards $d$. Loosely mounted on the lever in a position to engage with the rack is a pinion E, with which the large hand-wheel $e$ is rigidly connected.

In front of the rack D is the segmental track $d'$, and a roller $e'$, loosely mounted on the lever B, rests and rides upon said track, whereby the weight of the lever is supported. A guard-rail $d^2$, curved similarly to the track $d'$, is supported above and parallel with it, and the roller $e'$ lies between the rail and track. The rail and track are so far apart that the roller engages with only one of them at a time. The roller is held in place by the flange $b'$ and the collar $b^2$, which is pinned to said lever. The guard-rail prevents the lever from being so lifted as to cause the disengagement of the pinion E and rack D. The pinion E and its hand-wheel $e$ are held in place between the collar $b^2$ and the collar $b^3$. This latter collar is fastened to the lever by an easily-movable pin $b^4$, and when this pin is removed the collar $b^3$ and the pinion E may be moved backward to the position shown by the dotted lines, which causes the disengagement of the pinion and rack. The lever may then be operated by hand.

The two forks of the lever B are connected with the collar $a$ by means of the links G, pivotally connected with said forks and with the collar, respectively.

In most clutches the friction-surfaces are slowly worn away. Consequently it becomes necessary to move the sliding sleeve farther along on the shaft to produce the frictional engagement. With my device it is desirable when the lever B has a fixed fulcrum to provide means for adjusting the connection between the lever and the collar $a$, whereby the engagement and disengagement of the friction-surfaces is produced by the movement of the lever B through the same path at all times. To effect this result, I make the links G adjustable in length. The links, as shown, consist of two oppositely-threaded ends $g$ $g$ and a tapped sleeve $g'$, by which the ends are connected.

Having thus described my invention, I claim—

1. The combination of a sliding sleeve and a pivoted lever suitably connected therewith and adapted to operate it with a segmental rack, a pinion loosely mounted on the lever, and means for revolving said pinion, substantially as set forth.

2. The combination of a sliding sleeve and a pivoted lever suitably connected therewith and adapted to operate it with a segmental rack, a segmental track, a roller loosely mounted on the lever and adapted to ride on said track, a pinion loosely mounted on the lever and engaging with said rack, and means for revolving said pinion, substantially as set forth.

3. The combination of a sliding sleeve and a pivoted lever suitably connected therewith and adapted to operate it with a segmental rack, a segmental track, a guard-rail, and a pinion and a roller, both loosely mounted on the lever and engaging with the rack and track, respectively, substantially as set forth.

4. The combination of a sliding sleeve and a pivoted lever suitably connected therewith and adapted to operate it with a segmental rack, a pinion loosely mounted thereon and engaging with said rack, a hand-wheel rigid with said pinion, and a movable collar $b^2$, substantially as and for the purpose specified.

5. The combination of a sliding sleeve and a collar in which said sleeve is revoluble with a forked lever, a fixed standard, and an arm to which said forks are pivoted and by which the lever is supported, and adjustable links pivotally connected with said collar and lever, substantially as set forth.

6. The combination of a sliding sleeve, a collar in which said sleeve is revoluble, a pivoted lever, and adjustable links connecting said lever and collar with a segmental rack, a pinion engaging therewith, loosely mounted on said lever, a segmental track, and a roller loosely mounted on the lever and riding on said track, substantially as set forth.

JOHN WALKER.

Witnesses:
G. J. ZAHN,
M. A. KENSINGER.